United States Patent Office 3,766,067
Patented Oct. 16, 1973

---

3,766,067
CALCIUM-CONTAINING MICELLAR COMPLEXES
Richard Leo McMillen, Painesville, Ohio, assignor to The Lubrizol Corporation, Wickliffe, Ohio
No Drawing. Continuation-in-part of application Ser. No. 886,790, Dec. 19, 1969, now abandoned, which is a continuation-in-part of application Ser. No. 631,195, Apr. 17, 1967, now Patent No. 3,492,231, which is a continuation-in-part of application Ser. No. 612,332, Jan. 30, 1967, now Patent No. 3,384,586, which is a continuation-in-part of application Ser. No. 535,742, Mar. 21, 1966, which is a continuation-in-part of application Ser. No. 185,521, Apr. 6, 1962, now Patent No. 3,242,079. Said application Ser. No. 631,195 being a continuation-in-part of application Ser. No. 580,575, Sept. 20, 1966, now Patent No. 3,376,222, which is a continuation-in-part of applications Ser. No. 323,135, Nov. 12, 1963, now abandoned, and Ser. No. 558,287, June 17, 1966, now Patent No. 3,350,308, both being continuations-in-part of application Ser. No. 309,293, Sept. 16, 1963, now abandoned. Said application Ser. No. 612,332 being a continuation-in-part of applications Ser. No. 369,271, May 21, 1964, and Ser. No. 535,048, Mar. 17, 1966, both now abandoned. Finally, application Ser. No. 631,195 is also a continuation-in-part of application Ser. No. 535,693, Mar. 21, 1966, now Patent No. 3,372,115, which in turn is a continuation-in-part of said application Ser. No. 185,521. This application Sept. 9, 1971, Ser. No. 179,160
Int. Cl. C10m 5/22, 5/16, 7/36
U.S. Cl. 252—33
14 Claims

ABSTRACT OF THE DISCLOSURE

Calcium-containing micellar complexes are prepared by isolating the solid, calcium-containing matter from homogenized, carbonated, calcium-overbased organic acid salts with the air of such conversion agents as water and alcohols. These micellar complexes are characterized by a high calcium carbonate content and are readily and stably dispersed in nonpolar organic liquids. They are useful as additives in plastics, rubbers, paints, caulks, etc., where they function as fillers and thixotropic agents, and in the preparation of greases from natural and synthetic base stocks.

REFERENCES TO RELATED APPLICATIONS

This application is a continuation-in-part application of my earlier filed, copending application Ser. No. 886,790, filed Dec. 19, 1969, now abandoned; which in turn is a continuation-in-part of my earlier application Ser. No. 631,195, filed Apr. 17, 1967, now U.S. Pat. 3,492,231 (issued Jan. 7, 1970); which in turn is a continuation-in-part of my earlier application Ser. No. 612,332, filed Jan. 30, 1967, now U.S. Pat. 3,384,586 (issued May 21, 1968); which in its turn is a continuation-in-part of my earlier application Ser. No. 535,742, filed Mar. 21, 1966; which in its turn is a continuation-in-part of my earlier filed application Ser. No. 185,521, filed Apr. 6, 1962, now U.S. Pat. 3,242,079 (issued Mar. 22, 1966). The aforementioned U.S. Pat. 3,492,231 is also a continuation-in-part of my earlier filed application Ser. No. 580,575, filed Sept. 20, 1966, now U.S. Pat. 3,376,222 (issued Apr. 2, 1968); which in turn is a continuation-in-part of my earlier filed application Ser. No. 323,135, filed Nov. 12, 1963, now abandoned; and Ser. No. 558,287, filed June 17, 1966, now U.S. Pat. 3,350,308 (issued Oct. 31, 1967); which in their turn are continuations-in-part of my earlier filed application Ser. No. 309,293, filed Sept. 16, 1963, now abandoned. The aforementioned U.S. Pat. 3,384,586 is also a continuation-in-part of my earlier application Ser. No. 369,271, filed May 21, 1964, now abandoned; and Ser. No. 535,048, filed Mar. 17, 1966, now abandoned. Finally, the aforementioned U.S. Pat. 3,492,231 is also a continuation-in-part of my earlier filed Ser. No. 535,693, filed Mar. 21, 1966, now U.S. Pat. 3,372,115 (issued Mar. 5, 1968); which in turn is a continuation-in-part of my earlier noted U.S. Pat. 3,242,079.

This invention relates to calcium-containing compositions and processes for preparing them. More specifically, this invention is concerned with calcium-containing micellar complexes of calcium carbonate with an alkaline earth metal salt of an organic acid as well as processes for making and using these complexes.

As is well-known in the art, calcium carbonate has been used extensively in a variety of commercial applications, for example, as an extender pigment in paints; as a filler and/or reinforcing agent in plastics and rubbers; as anti-sag and thixotropic agents for plastics and caulks; etc. One disadvantage associated with the use of calcium carbonate for these purposes is the difficulty encountered in achieving uniform distribution of the calcium carbonate in the foregoing materials in which it is not soluble or otherwise readily dispersible. Obviously, it is desirable that the calcium carbonate be homogeneously dispersed through out these materials to achieve the greatest effectiveness. Accordingly, to the present invention, calcium-containing compositions are provided which, while retaining the desirable chemical and physical properties which render calcium carbonate useful in its wide range of commercial applications, are readily homogeneously and stably dispersed in paints, plastics, rubbers, fuels, lubricants, and the like.

Accordingly, it is a principal object of this invention to provide novel, calcium-containing compositions. More specifically, a principal object is to provide novel, micellar complexes of calcium carbonate with at least one alkaline earth metal salt of an organic acid. Another object is to provide processes for preparing these calcium-containing micellar complexes. It is also an object of this invention to provide calcium-containing micellar complexes which are readily and easily stably dispersed in nonpolar organic liquid diluents.

These and other objects of this invention are accomplished by providing solid, calcium-containing micellar complexes substantially free from organic liquid diluent and capable of being stably dispersed in nonpolar organic liquids upon mixing with said liquids, said complexes consisting essentially of calcium carbonate and at least one alkaline earth metal salt of an organic acid, the equivalent ratio of calcium present in said complex as calcium carbonate to alkaline earth metal present as organic acid salt being about 2:1 to about 100:1; said complex being further characterized by X-ray diffraction patterns corresponding to that of calcite having an average crystallite size within the range of 25 A. to about 400 A. These complexes can be prepared, for example, by a process comprising thoroughly admixing a carbonated, calcium-overbased salt of an organic acid having a metal ratio of at least 3 which is homogeneously dispersed in a substantially inert nonpolar organic liquid diluent with at least one member selected from the class consisting of alcohols containing up to twelve carbon atoms, water, and mixtures of these and thereafter separating substantially all of the nonpolar organic liquid diluent, alcohols, and water in the resulting reaction mixture from the remainder of the reaction mixture thereby isolating said micellar complex.

Organic acids susceptible to overbasing, that is those which can be converted to carbonate, calcium-overbased salts useful as intermediates in the present invention include the art-recognized class of organic acids which have been used or are presently used in preparing overbased alkaline earth metal salts such as those described in U.S. Pats. 3,312,618; 2,695,910; and 2,616,904. These acids generally have been oil-soluble acids because the overbased salts were prepared in oil and were intended primarily as oil additives. Oil-insoluble organic acids can be used to prepare the carbonate, calcium-overbased salts to be used as intermediates the present invention, however, provided they or their metal salts are soluble in substantially inert nonpolar organic diluents other than oils (e.g., aromatic hydrocarbons, alkanes, cycloalkanes, etc.). The organic acids should contain at least seven, and preferably twelve aliphatic carbon atoms in order to insure that the carbonated, calcium-overbased salts prepared therefrom can be readily converted to the desired micellar complexes and so that the micellar complexes will possess the desired physical and chemical properties discussed herein. There is no maximum carbon atom content provided the organic acids and/or their metal salts are soluble in conventional substantially inert, nonpolar organic liquid diluents.

The organic acids useful in preparing the calcium-overbased salts can be aliphatic, cycloaliphatic, aromatic acids or mixtures of these. Likewise, they may be saturated or unsaturated and characterized by the presence of one or more acid groups. An aromatic acid is one in which an acid function is bonded to a carbon in an aromatic ring while aliphatic and cycloaliphatic acids are those wherein an acid function is bonded to other than a carbon atom forming part of an aromatic ring.

Oil-soluble organic acids constitute a preferred class of acids. Organic acids are considered "oil-soluble" if they or their normal metal salts are oil-soluble. The oil-soluble phosphorus acids, carboxylic acids, and sulfur acids are very useful. The oil-soluble carboxylic and sulfonic acids are the most preferred organic acids for preparing the calcium-overbased salts.

It is contemplated that derivatives of these organic acids which are susceptible to overbasing such as their metal salts (e.g., Group I and Group II normal and basic metal salts) ammonium salts, and esters (particularly esters with lower aliphatic alcohols having up to six carbon atoms such as the lower alkanols,) may also be utilized in the preparation of the calcium-overbased salts used as intermediates in lieu of or in combination with the free acids. Thus, when reference is made herein to the organic acids, their equivalent derivatives susceptible to overbasing are implicity included unless it is clear that only the acid is intended. Preferably, an oil-soluble organic or its oil-soluble normal alkali or alkaline earth metal salts, including magnesium salts, or mixture of any of these will be employed as the oil-soluble organic acid reactant in the preparation of the carbonate, calcium-overbased organic acid salts.

The phosphorus-containing acids contemplated are characterized by at least one organic solubilizing group (e.g., aliphatic, aromatic, cycloaliphatic hydrocarbyl groups, etc.) attached directly to phosphorus via a carbon atom, e.g., oil-soluble phosphinic and phosphonic acids including the oil-soluble thiophosphinic and thiophosphonic acids characterized by average molecular weights of about 300 to about 10,000. Examples of such acids include dioctyldithiophosphinic acid, dicyclohexyldithiophosphinic acid, amylhexyldithiophosphinic acid, bis(dichlorophenyl)phosphinomonothioic acid, di-(octylnaphthyl)phosphinodithioc acid, chlorophenylisopropylphenyl-phosphinomonothioic acid, and the analogous phosphonic acids, i.e., those corresponding to the enumerated phosphinic acids wherein one of the hydrocarbon or substituted hydrocarbon groups is replaced with the corresponding hydrocarbonoxy group. Preferred phosphorus acids are those prepared by reacting aliphatic hydrocarbons with phosphorus sulfides (e.g., phosphorus pentasulfide). Steam-treated reaction products of phosphorus sulfides and poly-(1-monoolefins) such as polyisobutylene and polypropylene are particularly useful. Such acids are well-known as shown by U.S. Pats. 2,316,-078; 2,316,080; 2,316,091; 2,367,468; 2,375,315; 2,377,-955; 2,496,508; 2,507,731; 2,516,119; 2,597,750; 2,647,- 889; 2,688,612; 2,915,517; 3,347,790; and 3,401,185 which describe the preparation of metal salts of the acids and/or the preparation of the acid intermediates. The salts can be converted to the acid by neutralizing them with an inorganic acid such as HCl.

Suitable carboxylic acids include aliphatic, cycloaliphatic, and aromatic mono- and polybasic carboxylic acids and their thio analogs, i.e., those containing the groupings

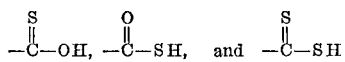

They may be saturated or unsaturated. Examples of these acids are the naphthenic acids, alkyl- or alkenyl-substituted cyclopentanoic acids, alkyl- or alkenyl-substituted cyclohexanoic acids, alkyl- or alkenyl-substituted aromatic carboxylic acids. The completely linear aliphatic acids i.e., those lacking any cycloaliphatic aromatic, or heterocyclic groups, should contain at least seven carbon atoms. Generally, if the aliphatic carbon chain is branched, the acids are more oil-soluble for any given carbon atom content. Specific examples include 2-ethylhexanoic acid, α-linolenic acid, propylene tetramer-substituted succinic acid, propylene tetramer-substituted maleic acid, behenic acid, isostearic acid, pelargonic acid, capric acid, palmitoleic acid, linoleic acid, lauric acid, oleic acid, ricinoleic acid, undecyclic acid, dioctylcyclopentane carboxylic acid, myristic acid, dilauryl-decahydronaphthalene carboxylic acid, stearyloctahydroindene carboxylic acid, palmitic acid, dotriacontanoic acid, 2-tetradecenoic acid, azelaic acid, suberic acid, thiostearic acid, sebacic acid, dodecanedioic acid, 5-octene-3,3,6-tricarboxylic acid, 9,10-dihydroxystearic acid, p-(isobutyl)-phenylacetic acid, α-ethylcyclohexaneacetic acid, 1-naphthalene-acrylic acid, mono-, di-, and tripolyisobutenyl (M.W.: 200–1200) substituted salicyclic acids and thiosalicyclic acids, commercially available mixtures of two or more carboxylic acids such as tall oil acids, rosin acids, naphthenic acids, and the like.

Of the carboxylic acids, the aliphatic mono- and polycarboxylic acids containing from about eight to about thirty aliphatic carbon atoms are preferred. These preferred aliphatic carboxylic acids can be straight or branched chain acids and may be saturated or characterized by the presence of one or more ethylenic groups, i.e.,

Oil-soluble aromatic carboxylic acids very useful in preparing the carbonated, calcium-overbased salts include those represented by the general formula:

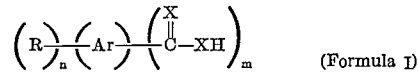 (Formula I)

where R is a hydrocarbon or essentially hydrocarbon radical containing at least four aliphatic carbon atoms, $n$ is an integer of from one to four, Ar is a polyvalent aromatic hydrocarbon radical having a total of up to fourteen carbon atoms in the aromatic nucleus, each X is independently a divalent sulfur or oxygen group, and $m$ is an integer of from one to four with the proviso that R and $n$ are such that there is an average of at least eight aliphatic carbon atoms provided by the R substituents for each acid molecule represented by Formula I. Examples of aromatic radicals represented by the variable Ar are the polyvalent aromatic radicals derived from benzene, naphthalene, anthracene, phenanthrene, indene, fluorene, biphenyl, and the like. Generally, the radical represented by Ar will be a polyvalent radical derived from benzene or naphthalene such as phenylenes and naphthylenes, e.g., methylphenylenes, ethoxyphenylenes, nitrophenylenes, isopropylphenylenes, hydroxyphenylenes, mercaptophenylenes, N,N-diethylaminophenylenes, chlorophenylenes, dipropoxynaphthylenes, triethylnaphthylenes, and similar tri-, tetra-, pentavalent radicals thereof, etc.

The R variables are usually hydrocarbon groups, preferably aliphatic hydrocarbon groups such as alkyl or alkenyl radicals. However, the R groups can contain such substituents as phenyl, cycloalkyl (e.g., cyclohexyl, cyclopentyl, etc.), and nonhydrocarbon groups such as nitro, amino, halo (e.g., chloro, bromo, etc.), lower alkoxy, lower alkyl mercapto, oxo substituents (i.e., $=O$), thio groups (i.e., $=S$), interrupting groups such as —NH—, —O—, —S—, and the like provided the essentially hydrocarbon character of the R variable is retained. The hydrocarbon character is retained for purposes of this invention so long as any non-carbon atoms present in the R variable do not account for more than about 10% of the total weight of the R variables. Examples of R groups include butyl, isobutyl, pentyl, octyl, nonyl, dodecyl, docosyl, tetracontyl, 5-hydroxyoctyl, 4-ethoxynonyl, 4-hexenyl, 3-cyclohexyloctyl, 4-(phenyl)heptyl, 2,3,5-trimethylheptyl, 4-ethyl-5-methyloctyl, and substituents derived from polymerized olefins such as polychloroprenes, polyethylenes, polypropylenes, polyisobutylenes, ethylenepropylene copolymers, chlorinated olefin polymers, oxidized ethylene-propylene copolymers, and the like. Likewise the variable Ar may contain nonhydrocarbon substituents, for example, such diverse substituents as lower alkoxy, lower alkyl mercapto, nitro, halo (e.g., chloro, bromo, iodo), alkyl or alkenyl groups of less than four carbon atoms, hydroxy, mercapto, and the like.

Included within the group of oil-soluble aromatic carboxylic acids are those corresponding to the formula

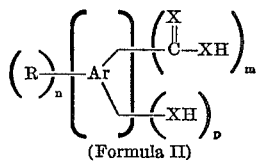

(Formula II)

where R, X, Ar, $m$ and $n$ are as defined in Formula I and $p$ is an integer of 1 to 4, usually 1 or 2. The aromatic acids include hydroxy aromatic acids such as

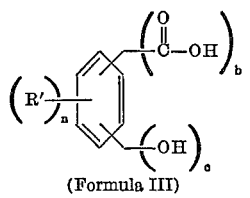

(Formula III)

where R' is an aliphatic hydrocarbon radical containing at least four carbon atoms, $a$ is an integer of from 1 to 3, $b$ is 1 or 2, $c$ is zero, 1, or 2 and preferably 1 with the provisio that R' and $a$ are such that the acid molecules contain at least an average of about twelve aliphatic carbon atoms in the aliphatic hydrocarbon substituents per molecule. Thus, the useful aromatic carboxylic acids include salicyclic acids and their derivatives susceptible to overbasing wherein the aliphatic hydrocarbon substituents are derived from polymerized olefins, particularly polymerized lower 1-mono-olefins having an average molecular weight of about 200 to about 1200, preferably about 300 to about 700 such as polyethylene, polypropylene, polyisobutylene, ethylene-propylene copolymers, and the like.

The oil-soluble carboxylic acids corresponding to Formulae I–III above are well-known or can be prepared according to procedures known in the art. Carboxylic acids of the type illustrated by the above formulae and processes for preparing their metal salts are disclosed in such U.S. patents as 2,197,832; 2,197,835; 2,252,662; 2,252,664; and 2,714,092.

A particularly preferred class of oil-soluble organic acids for use in preparing the carbonated, calcium-overbased salts are the oil-soluble sulfonic acids including synthetic oil-soluble sulfonic acids. Suitable oil-soluble sulfonic acids include those represented by the general formulae:

$$R_x-T-(SO_3H)_y \quad \text{(Formula IV)}$$

$$R'-(SO_3H)_r \quad \text{(Formula V)}$$

In Formula IV, T is a cyclic nucleus of the mono- or polynuclear type including benzenoid or heterocyclic nuclei such as a polyvalent radical derived from benzene, naphthalene, anthracene, 1,2,3,4-tetrahydronaphthalene, thianthrene, biphenyl, and the like. Ordinarily, however, T will represent an aromatic hydrocarbon nucleus, especially one derived from benzene or naphthalene. The variable R in the radical $R_x$ includes the same groups as the R variable in Formula I above and can be, for example, an aliphatic group such as alkyl, alkenyl, alkoxy, alkoxyalkyl, carboalkoxyalkyl, an aralkyl group, or other hydrocarbon or essentially hydrocarbon groups, while $x$ is at least one with the proviso that the variables represented by the group $R_x$ are such that the acids are oil-soluble. This generally requires that the groups represented by $R_x$ contain an average of at least about seven aliphatic carbon atoms per sulfonic acid molecule and preferably at least about twelve aliphatic carbon atoms. Generally $x$ will be an integer of 1–3. The variables $r$ and $y$ have an average value of one to about four per molecule, preferably one or two.

The variable R' in Formula V is an aliphatic or aliphatic-substituted cycloaliphatic hydrocarbon or essentially hydrocarbon radical. Where R' is an aliphatic radical, it preferably contains at least about fifteen carbon atoms and where R' is an aliphatic substituted-cycloaliphatic group, the aliphatic substituents should contain a total of at least about twelve carbon atoms. Examples of R' are alkyl, alkenyl, and alkoxyalkyl radicals and aliphatic-substituted cycloaliphatic radicals wherein the aliphatic substituents are alkoxy, alkoxyalkyl, carboalkoxyalkyl, etc. Generally the cycloaliphatic radical will be a cycloalkene nucleus or a cycloalkene nucleus such as cyclopentane, cyclohexane, cyclohexene, cyclopentene, and the like. Specific examples of R' are cetyl-cyclohexyl, lauryl-cyclohexyl, cetyloxyethyl and octadecenyl radicals and radicals derived from petroleum, saturated and unsaturated paraffin wax, and polyolefins, including polymerized mono- and diolefins containing from about one to eight carbon atoms per olefin monomer unit. The groups T, R, and R' in Formulae IV and V can also contain other substituents such as hydroxy, mercapto, halogen, nitro, amino nitroso, carboxy, lower carboalkoxy, etc., as long as the essentially hydrocarbon character of the groups is not destroyed.

Sulfonic acids falling within Formulae IV and V are disclosed in such prior U.S. patents as 2,616,904; 2,616,-905; 2,723,234; 2,723,235; 2,723,236; and 2,777,874.

Specific illustrative examples of suitable sulfonic acids are the petroleum sulfonic acids, the alkylated benzene and naphthalene sulfonic acids, and the like; e.g., mahogany sulfonic acids, petrolatum sulfonic acids, mono- and polywax- substituted naphthalene sulfonic acids, cetylchlorobenzene sulfonic acids, cetylphenol sulfonic acids, cetylphenol disulfide sulfonic acids, cetoxycapryl benzene sulfonic acids, dicetyl thianthrene sulfonic acids, dilauryl-beta-naphthol sulfonic acids, dicapryl nitronaphthalene sulfonic acids, paraffin wax sulfonic acids, unsaturated paraffin wax sulfonic acids, hydroxy-substituted paraffin wax sulfonic acids, octylsulfonic acids, dodecyl sulfonic acids, tetraisobutylene sulfonic acids, tetraamylene sulfonic acids, mono-, di-, and tri-heptylbenzene sulfonic acids, mono-, di-, and tri-dodecylbenzene sulfonic acids, polyisobutylene (M.W.—360)-substituted naphthalene disulfonic acids, chloro-substituted paraffin wax sulfonic acids, nitrosyl-substituted paraffin wax sulfonic acids, petroleum naphthene sulfonic acids, cetylcyclopentyl sulfonic acids, lauryl cyclohexyl sulfonic acids, mono- and polywax-substituted cyclohexyl sulfonic acids, and the like. (As used herein, the terminology "petroleum sulfonic acids" or "petrosulfonic acids" is intended to cover that class of sulfonic acids derived from petroleum products according to conventional processes such as disclosed in U.S. Pats. 2,480,638; 2,483,800; 2,717,265; 2,726,261; 2,794,829; 2,832,801; 3,225,086; 3,337,613; 3,351,655; and the like.)

Other organic sulfur acids such as the sulfinic acids corresponding to the above-described sulfonic acids are suitable for preparing the carbonated, calcium-overbased salts. Sulfinic acids are exemplified by 1,12-dodecanedisulfinic acid, 1,10-decanedisulfinic acid, 1,18-octadecanedisulfinic acid, alkylbenzenesulfinic acid wherein the alkyl groups contain twelve- fourteen carbon atoms, etc.

Mixtures of two or more of the above-described organic acids and derivatives thereof susceptible to overbasing can be employed to prepare carbonated, calcium-overbased salts to be used as intermediates in the preparation of the micellar complexes of this invention.

As used in the present specification the terminology "calcium-overbased salt" is intended to describe those organic acid salts characterized by the presence of a stoichiometric excess of metal relative to the number of equivalents of organic acid present therein based on the normal stoichiometry of the particular metal and organic acid. For example, a "neutral" or "normal" organic acid salt of calcium is characterized by an equivalent ratio of metal to acid of 1:1, while a basic salt is characterized by a higher ratio, e.g., 1.1:1, 2:1, 5:1, 10:1, 15:1, 20:1, etc. The term "metal ratio" is used to designate the ratio of equivalents of metal to acid in an overbased salt to the number of equivalents expected to be present in a "normal salt" based on the usual stoichiometry of the metal or metals involved and the organic acid or acids present. Thus, an oil-solution of a carbonated, calcium-overbased salts containing one equivalent of an oil-soluble sulfonic acid, one equivalent of an oil-soluble carboxylic acid, and twenty equivalents of calcium would have a metal ratio of 20÷(1+1) or 10. Likewise, an oil-solution of an overbased salt characterized by the presence of two equivalents of a petrosulfonic acid, one equivalent of isostearic acid, three equivalents of barium, and fifteen equivalents of calcium has a metal ratio of $$(3+15) \div (2+1)$$

or 6. For purposes of this invention, the carbonated, calcium-overbased organic acid salts must have a minimum metal ratio of three and, preferably about four and one-half. The upper metal ratio is not critical but usually does not exceed about thirty. The preferred range of metal ratios is from about four and one-half to about twenty.

While the carbonated, calcium-overbased salts used as intermediates according to this invention preferably will contain calcium as the only metal present in any significant amount, overbased salts containing other alkaline earth metals in addition to calcium can be used. Those carbonated, overbased salts containing at least one other alkaline earth metal in addition to calcium are regarded as being calcium-overbased if at least two-thirds of the total equivalents of alkaline earth metal present therein is attributable to calcium. Such overbased "mixed" salts are easily prepared, for example, by using a normal or basic barium or magnesium salt as the organic acid derivative to be carbonated in the presence of a basically reacting calcium compound as discussed above. Or mixtures of separately prepared normal or basic alkaline earth metal salts of organic acids (other than calcium salts) can be added to a carbonated, calcium-overbased salt. Other known procedures for preparing such "mixed" salts are apparent to those skilled in the art.

Metal salts of acids characterized by metal ratios in excess of one have been referred to in the prior art as "basic salts," "complex salts," "superbased salts," "overbased salts," and the like. Herein the term "overbased" is usually employed. The processes for making such salts are referred to as "overbasing" processes. The exact nature of these carbonated, calcium-overbased salts is not understood. It has been suggested that they comprise stable dispersions of salts formed by contacting an acidic material such as carbon dioxide with the basically reacting metal compounds. Others regard them as "polymeric salts" formed by the reaction of the acidic material, the acid being overbased, and the basically reacting metal compound (see, for example, German Auslegeschrift 1,243,-915). For this reason, the salts are described herein principally by reference to the processes and starting materials by which they are produced.

In the present specification, oil-soluble organic acids are regarded as having one equivalent of acid per acidic hydrogen or acid group. Thus, a monocarboxylic acid or monosulfonic acid or their equivalent derivatives such as esters and ammonium and metal salts have one equivalent per mole of acid; ester, or salt; a disulfonic acid or dicarboxylic acid or equivalent derivative has two equivalents per mole, etc. Basically reacting alkali metal compounds such as sodium hydroxide have one equivalent per mole (more accurately, one equivalent per atomic weight of metal). The basically reacting alkaline earth metal compounds such as the oxides, hydroxides, carbonates, and alkoxides (e.g., calcium oxide, calcium hydroxide, barium oxide, barium hydroxide, strontium hydroxide, calcium carbonate, calcium methoxide, magnesium oxide, magnesium hydroxide, barium isopropoxide etc.,) have two equivalents per mole (i.e., two equivalents per atomic weight of metal).

Carbonated, calcium-overbased alkaline earth metal salts of organic acids can be prepared by conventional procedures well-known in the art. Generally, they are prepared by introducing carbon dioxide into a mixture comprising at least one organic acid or alkaline earth metal salt thereof, a basically reacting calcium compound (such as calcium hydroxide, calcium oxide, or calcium alcoholate) in the presence of a promoter which is generally an alcohol, usually methanol, but may be any of a variety of other known promoting materials such as amines, aminoalcohols, phenols, calcium phenates, and the like. In another procedure, the basically reacting calcium compounds are carbonated in the presence of promoters and the carbonated material and the organic acids are then mixed and the resulting mixture hydrolyzed, according to known procedures. These processes are conducted under conditions that provide an overall stoichiometric excess of calcium metal relative to the organic acid being overbased. Carbonation is continued until the amount of calcium incorporated into the carbonated reaction product is greater than the stoichiometric equivalent of organic acid present. Carbonation is generally conducted in the presence of a substantially inert, nonpolar organic liquid diluent. The carbonated, calcium-overbased organic acid salts thus produced are generally in the form of stable, clear, homogeneous organic liquid solutions in these same diluents.

As carbonation proceeds, the basically reacting calcium compound becomes solubilized in the organic phase and the carbonated product is transformed into a homogeneous composition containing a stoichiometric excess of metal. The mechanism of the formation of this normally homogeneous product is not fully understood. It is believed, however, that carbonation converts the excess metal base to a carbonate or bicarbonate which forms, with the metal salt of the oil-soluble acid, some type of complex which is dispersed in the organic phase. It is not necessary for all of the basically reacting calcium compound present in the carbonation mixture to be converted by carbonation to a solubilized, homogeneous product. In many instances, a homogeneous product is obtained when as little as 75% of the stoichiometric excess of the basically reacting calcium compound is carbonated.

During the carbonation step and in the subsequent homogenization step discussed hereinbelow, the amount of diluent employed should be controlled so that the solution of carbonated, calcium-overbased organic acid thus produced will comprise from about 10% to about 80% of the product or, from another viewpoint, the nonpolar, organic liquid diluent will comprise 20% to 90% thereof. For best results in the homogenization procedure discussed below, the diluent should comprise at least about 30% by weight of the solution of the carbonated, calcium-overbased organic acid salt.

In order to obtain optimum homogeneity, it is desirable to remove any insoluble solids present in the carbonated, calcium-overbased organic acid salts produced by conventional techniques such as filtration, centrifugation, decantation, and the like. Likewise, volatiles can be removed, if desired, by distillation at atmospheric or reduced pressures. Further parameters of the overbasing process are well-known in the art and will not be repeated herein.

Substantially inert, nonpolar organic liquid diluents useful in the present invention include the alkanes of six to eighteen carbon atoms, the cycloalkanes of five or more carbon atoms, the corresponding alkyl-substituted cycloalkanes, the arylhydrocarbons, the alkylarylhydrocarbons, the aralkylhydrocarbons. Specific examples include petroleum ether, Stoddard solvent, hexane, octane, isooctane, dodecane, tetradecane, ethylcyclopentane, cyclohexane, isopropylcyclohexane, dimethylcyclohexane, benzene, toluene, xylene, ethylbenzene, tertiary-butyl benzene, low viscosity mineral oils, and the like. A diluent should be selected in which the normal alkaline earth metal salts of the particular organic acid or acids being overbased are soluble.

The foregoing description of the preparation of carbonated, calcium-overbased organic acid salts is abbreviated since it is unnecessary to present in detail a description of the processes for preparing such well-known intermediates. Detailed procedures for the preparation of carbonated, calcium-overbased organic acids are found in such U.S. patents as 2,616,924; 2,616,925; 3,170,880; 3,256,186; 3,271,310; 3,277,002; 3,282,835; 3,312,618; 3,350,308 and in my own U.S. patents No. 3,242,079; 3,372,115; 3,376,222; 3,377,283; 3,384,586; and (the patent to issue from my application Ser. No. 631,195 filed Apr. 17, 1967).

To prepare the desired micellar complexes from the carbonated, calcium-overbased organic acid salts discussed hereinabove, it is first necessary to subject solutions of those salts in substantially inert, organic liquid diluents, conveniently the diluents in which they were prepared, to a homogenization step in the presence of certain materials designated as conversion agents. Homogenization can be accomplished by vigorous admixing, e.g., by mechanical agitation such as stirring, shaking, vibrating, etc. Homogenization can also be accomplished by passing the mixture of the organic liquid solution of the carbonated, calcium-overbased salts and the conversion agents through elongated heating tubes under pressure. Complete details for accomplishing this homogenization step are described in my U.S. Pats. 3,242,079; 3,372,115; 3,376,222; 3,377,283; 3,384,586; and U.S. Pat. 3,492,231 which issued from my copending application Ser. No. 631,195 filed Apr. 17, 1967.

For purposes of this invention, homogenization is achieved by the vigorous mechanical agitation of the carbonated, calcium-overbased organic acid salt solution in the presence of a conversion agent selected from the class consisting of water, alcohols, or mixtures of alcohols and water. The mechanical agitation is generally conducted at the reflux temperature or a temperature slightly below reflux. However, homogenization may be achieved within the range of about 25° C. to about 200° C. or higher. Usually there is no real advantage in exceeding 150° C. It is ot be understood, however, that higher temperatures and/or pressure may be required when using the process described in U.S. Pat. 3,377,283 in order to achieve homogenization of the materials. If the carbonated, overbased-calcium salt being homogenized is one prepared in the presence of mineral oil or other viscous organic liquid, it is desirable to add a more fluid, less viscous, nonpolar, organic liquid diluent (e.g., heptane, xylene, naphtha, etc.), prior to or during homogenization to facilitate mixing and further handling of the homogenized product (e.g., pouring, pumping, etc.) since homogenization is accomplished by a "thickening" or "gelling" phenomenon and the thickened products are more difficult to handle in the absence of less fluid diluents.

The amount of the conversion agent (alcohol, water or alcohol-water mixtures) used in the homogenization step is usually within the range of about 1% to about 80% based upon the weight of the carbonated, calcium-overbased organic acid salt excluding the weight of inert, organic diluents and any promoter remaining in the solution of the calcium-overbased salt. Preferably at least about 10% and usually less than about 60% by weight of water, alcohols, or alcohol-water mixtures will be employed. Amounts above about 60% appear to afford no advantages.

Useful alcohols include aliphatic, cycloaliphatic and arylaliphatic mono- and polyhydroxy alcohols. Aliphatic alcohols having less than about twelve carbon atoms are especially useful with the lower alkanols, i.e., alkanols having less than about eight carbon atoms being preferred for reasons of effectiveness and economy. Illustrative alcohols include such alkanols as methanol, ethanol, isopropanol, n-propanol, isobutanol, tertiary butanol, isooctanol, dodecanol, n-pentanol, etc; cycloaliphatic alcohols, such as cyclopentanol, cycolhexanol, 4-methylcyclohexanol, 2-cyclohexylethanol, etc.; arylaliphatic alcohols such as benzyl alcohol, 2-phenylethanol, and cinnamyl alcohol; alkylene glycols with up to about six carbon atoms and mono-lower alkyl ethers thereof such as mono-methyl ether of ethylene glycol, diethylene glycol, ethylene glycol, trimethylene glycol, hexamethylene glycol, triethylene glycol, 1,4-butanediol, glycerol, and the like including mixtures of two or more such alcohols.

The use of mixtures of water and one or more of the alcohols is especially effective as a conversion agent in the homogenization step. These alcohol-water mixtures reduce the length of time required to achieve homogenization and offer other processing advantages. Any alcohol-water mixture is obviously effective since either water or alcohol alone is effective. However, especially effective mixtures are those containing one or more alcohols and water in a weight ratio of alcohol to water of about 0.05:1 to about 24:1, preferably about 0.5:1 to about 3:1. Water-alkanol mixtures wherein the alcoholic portion is one or more lower alkanols seem to produce the best overall advantages from the standpoint of results produced, economy, and processing ease.

The homogenization step is continued for a period which can vary between about .25 hour (e.g., for small laboratory preparations) and about 96 hours (e.g., large commercial batches) depending on the amount of material being homogenized, the homogenization temperature, the vigorousness of the agitation, and the amount of water, alcohol, or water-alkanol mixtures present. Usually, homogenization will be conducted for a period within about 3 to about 72 hours. Obviously, the determination of optimum periods is within the skill of the art.

Homogenization is accompanied by a transformation in the carbonated, calcium-overbased organic acid salts which is not completely understood. The solutions or dispersions of the carbonate, calcium-overbased organic acid salts used as starting materials in the homogenization step are, as previously stated, generally clear, easily filterable materials. They possess essentially Newtonian rheological properties. However, upon completion of the conversion step, the resulting product is characterized by essentially non-Newtonian properties. Likewise, during the homogenization step, the solutions of the carbonated, calcium-overbased organic acid salts undergo a thickening phenomenon so that, in many cases, especially where the diluent is mineral oil or contains mineral oil, they attain the consistency of a gel or grease. Furthermore, X-ray diffraction studies of the carbonated, calcium-overbased organic acids does not indicate the presence of any crystalline calcium carbonate. After homogenization, X-ray diffraction patterns indicate the presence of crystalline particles characterized by a diffraction pattern corresponding to that of calcite. While applicant does not intend to be bound by any theory offered to explain the changes which accompany the homogenization step, it appears that homogenization facilitates or causes particle formation and/or particle growth. That is, the amorphous, calcium-containing salts or complexes present in the carbonated, calcium-overbased starting material in some way undergo a process which gives rise to the formation of crystalline calcium carbonate-containing particles that produce X-ray diffraction patterns characteristic of crystallites of calcite having average crystallite sizes within the range of about 25 A. to about 400 A. along the shohrtest dimension, preferably 25 A. to 200 A. For example, the X-ray diffraction pattern for a homogenized calcium-overbased alkylated benzene sulfonic acid having a metal ratio of about twelve corresponded to that of calcite having crystallite dimensions of about 260 x 260 x 90 A.

After the homogenization step, the homogenized product is suitable for preparing the micellar complexes. But, it has been found advantageous to subject the homogenized product to a post-treatment whereby an acidic gas such as $CO_2$, $SO_2$, or $H_2S$, is blown through the homogenized product to reduce the residual basicity thereof. A method for achieving this neutralization is described in my U.S. Pat. 3,422,013. Furthermore, the calcium content of the homogenized product can be greatly increased by adding promoters and basically reacting calcium compounds to the homogenized product and resuming carbonation. In this manner, metal ratios of up to 100 or even more can be achieved. The calcium incorporated into the homogenized products by this subsequent overbasing step may not be in the form of a calcium carbonate crystalline material which produces X-ray diffraction patterns characteristics of calcite. X-ray studies indicate that some of the calcium carbonate-containing materials formed in this subsequent or post-homogenization overbasing step is in the form which produces diffraction patterns corresponding to that exhibited by vatarite. Preferably, the micellar complexes will be prepared from homogenized products in which at least 25% preferably at least 50%, of the calcium carbonate present exhibits X-ray diffraction patterns corresponding to that of calcite. So far, best results have been achieved insofar as imparting thixotropic properties to resins, paints, etc., with the micellar complexes if prepared from homogenized products where 75% to substantially all of the calcium carbonate exhibits X-ray diffraction patterns characteristic of calcite.

To prepare the micellar complexes, the solid, calcium carbonate-containing materials produced in the homogenization step must be separated from the nonpolar, inert organic diluents. This separation step can be achieved by thin-film evaporation techniques, vacuum distillation procedures, precipitation techniques, and the like as described hereinafter.

Precipitation of the desired micellar complexes is readily accomplished by admixing the homogenized product with a substantially inert, polar, organic liquid diluent. Upon mixing of these materials, the micellar complex precipitates and can be recovered if desired, by removal of the precipitated complexes from the polar phase by filtration, decantation, dialysis, evaporation of the liquid, and the like. When the micellar complexes are recovered by the precipitation procedure, they usually exist as dry powders after removal of the polar organic liquid used to precipitate them. However, when the orgaic diluent is removed directly by evaporation of the liquid portion of the homogenized product, the micellar complexes tend to cake or form solids which may be powdered easily by conventional powder-making techniques such as grinding, ball-milling, etc.

The calcium carbonate-containing particles present in the homogenized products form micelles with the alkaline earth metal salts of the organic acids present, for example, calcium petrosulfonates. These calcium-containing micellar complexes involve an orientation of the organic acid salt around the calcium carbonate, presumably with the acid salt function being adjacent to the surfaces of the calcium carbonate crystallites and the hydrocarbon portions of the organic acids extending outwardly therefrom. The type of attraction or bonding between the organic acid salts and the calcium carbonate is not known. However, more appears to be involved than conventional intermolecular attractions such as van der Waals forces. It is possible that some type of ionic bond exists between the acid salt function in the organic acid and the calcium carbonate but this has not been clearly established.

Nevertheless, extensive analytical studies have established that the organic acid salt does not function as a simple organic coating on the calcium carbonate crystals but is somehow bonded to these crystals. Thus, when the calcium-containing micellar complexes are separate from the homogenized products, and the isolated micelles are then washed with organic solvents, it is possible to remove from the isolated micellar complexes some entrapped organic diluents and some "unbonded" organic acid salt. But the organic acid salts associated with the micellar complexes are not removed by washing. On the other hand, if an organic acid such as oleic acid is applied to commercially available calcium carbonate particles to form an organic coating thereon, the coating is readily removed by washing the calcium carbonate with an organic solvent.

Furthermore, thermal decomposition studies of the calcium-containing micellar complexes prepared by precipitating them from a homogenized, carbonated, calcium-overbased sulfonate having a metal ratio of about twelve indicates that heating the precipitated micellar complexes above about 350° C. causes the bond between the calcium carbonate and the calcium sulfonate to break. Before the bond, whatever its nature, is broken, the precipitated calcium-containing micelles are readily dispersible in nonpolar organic liquids such as mineral oil, xylene, etc. However, after this bond is broken by heating to a temperature in excess of about 350° C., the calcium carbonate portion of the thermally destroyed micelles is no longer dispersible in nonpolar organic liquid diluents even though the calcium sulfonate portion has not been destroyed. The calcium sulfonate per se is not destroyed in significant amounts until a temperature of about 500°–525° C. is reached.

It is not necessary for all of the alkaline earth metal salt in the homogenized product to be stably bonded with the calcium carbonate-containing particles formed in the homogenization step. Thus, some of the organic acid salt present in the homogenized products may be removed during the separation step or upon further washing of the micellar complex with organic solvents. However, this portion of the organic acid salt which may be removable is either not involved in the formation of the micellar complexes or is only weakly bonded to the calcium carbonate-containing particles. Accordingly, the ratio of equivalents of calcium present as calcium carbonate to the equivalents of alkaline earth metal present as a normal organic metal salt in the micellar complex may be different, i.e., higher, than that of the homogenized product from which it is prepared since the number of equivalents of acid is reduced by this removal. Thus, the micellar complexes may be characterized by metal ratios of from about 3 to about 100, usually about 3 to about 50, and preferably, about 4.5 to about 40.

From the foregoing, it is obvious that if evaporation techniques such as thin-film evaporation procedures are utilized to separate the micellar complexes from the organic liquids present in the homogenized products, the temperature should not be permitted to exceed about 350° C., preferably 300° C., in order to avoid breaking of the bond between the organic acid salt portion of the micelles and the calcium carbonate portion. If evaporation procedures are used to achieve separation, the use of reduced pressures may be necessary to avoid exceeding these temperatures where the diluent is not readily removed at lower temperatures.

The substantially, inert, polar organic liquids utilized in separating the micellar complexes from the nonpolar diluents by the precipitation technique are not critical and any polar organic liquid may be employed for this purpose as long as it does, in fact, cause the calcium-containing micelles to precipitate. It is preferred that these polar diluents have boiling points at standard temperature and pressure less than 300° C. for reasons discussed above. In fact, it is convenient to select polar organic liquids boiling at lower temperatures, e.g., less than 150° C., since this facilitates subsequent drying of the precipitate if that should be desired. It is sometimes convenient to use the polar organic liquids in admixture with nonpolar diluents such as described hereinbefore (e.g., hexane, octane, benzene, etc.) to facilitate mixing, etc. For reasons of economy, availability, ease of use, and excellent results achieved, aliphatic alcohols and ketones constitute a preferred group of polar organic liquids for precipitating the micellar complexes with the lower alkanols and lower alkyl ketones, either symmetrical or unsymmetrical, and mixtures thereof being especially preferred. Specific examples include methanol, ethanol, n-propanol, n-butanol, n-pentanol, n-hexanol, n-heptanol, isopropyl alcohol, isobutyl alcohol, tertiary butyl alcohol, isoamyl alcohol, tertiary amyl alcohol, allyl alcohol, 2-chloroethanol, 1-chloro-2-propanol, dimethyl ketone, diethyl ketone, dipropyl ketone, dibutyl ketone, diamyl ketone, methyl ethyl ketone, methyl propyl ketone, methyl butyl ketone, methyl amyl ketone, methyl hexyl ketone, ethyl propyl ketone, chloroacetone, diacetone alcohol and the like. Alkyl ketones and alkanols of up to four carbon atoms each and mixtures thereof are particularly effective, e.g., acetone, isopropanol, and mixtures of these. Other organic liquids which can be used alone in admixture with the alcohols or ketones include dimethylformamide, dimethylacetamide, carbon tetrachloride, trichloro benzenes, diethyl ether of ethylene glycol, diethyl ether, dioxane, and the like. While pentane is not a polar organic liquid, it also possesses the ability to cause most of the micellar complexes to precipitate from the homogenized products.

When employing the precipitation technique to separate the micellar complexes, the organic polar liquid and the homogenized product are mixed in a weight ratio of polar liquid to homogenized product of about 0.5:1 to 20:1. Better separation is achieved in most instances, however, if the minimum ratio is at least about 1.5:1. Generally, there is no advantage in exceeding a ratio of about 10:1. Precipitation normally commences as soon as the polar liquid and homogenized product are mixed, even at ambient temperature. Cooling may be employed to increase the efficiency of separation. After precipitation, the precipitated micellar complexes can be recovered by filtration, centrifugation, and other conventional means.

The following examples illustrate the present invention. Examples 1–6 illustrate the preparation of intermediates. As used in these examples and elsewhere in the specification, "percentages" and "parts" refer to percent by weight and parts by weight unless otherwise specified.

EXAMPLE 1

(a) A mixture comprising 280 parts of a commercial mixture of fatty acids distilled from tall oil acids (sold as Acintol FA-1 Special by the Arizona Chemical Company and said to comprise about 44% linoleic acids, 52% oleic acids, and 4% saturated carboxylic acids), 1123 parts of VM and P naphtha (Varnish Maker's and Painter's naphtha), 148 parts calcium hydroxide, and 67 parts methanol is carbonated at 50°–55° C. until the carbon dioxide uptake substantially ceases, that is, until the amount of carbon dioxide introduced into the mixture is substantially equal to the amount of carbon dioxide exiting the mixture. The carbonated mass is blown with nitrogen while the temperature is elevated to about 117° C. over a 1.75 hour period and thereafter filtered. The filtrate is a clear, dark amber liquid characterized by a sulfate ash content of about 14.5% and a metal ratio of about 3.3.

(b) A mixture comprising 282 parts of the carboxylic acid mixture described in (a), 876 parts boiled linseed oil, 175 parts methanol, 44 parts primary amyl alcohol, and 296 parts of calcium hydroxide is carbonated for about three hours while maintaining a temperature of 77°–79° C. at which time the carbon dioxide uptake has substantially ceased and the carbonated mass has a neutralization number (phenolphthalein) of about 1.6 (basic). This carbonated mixture is blown with nitrogen for one hour while the temperature is elevated to 150° C. and is then held at about 150° C. for an additional hour with continued nitrogen blowing at which time 383 parts of xylene are added. The mixture containing xylene is held at about 120° C. for about 0.25 hour and filtered. The filtrate is a clear, dark amber solution of the desired carbonated, calcium-overbased carboxylic acid mixture (metal ratio of about 7.7) containing about 46% linseed oil and 20% xylene. It is characterized by a calcium sulfate ash content of about 27.5%.

(c) A mixture comprising 280 parts of the carboxylic acid mixture of (a), 1271 parts VM and P naphtha, 272 parts calcium hydroxide, and 140 parts methanol, is carbonated for about 0.75 hour at a temperature of 60°–65° C. Then 272 parts of calcium hydroxide are added and carbonation is continued for about 1.3 hours at 60°–65° C. at which point the carbon dioxide uptake has substantially ceased. The carbonated mixture is then blown with nitrogen while heating at 120° C. to remove water and methanol. It is then filtered at a temperature of about 115° C. The filtrate is a 60% naphtha solution of the desired carbonated, calcium-over-based carboxylic acid mixture (metal ratio about 9.9) and is characterized by a calcium sulfate ash content of 31.7%.

Following the general procedure of (c) above, a carbonated, calcium-overbased carboxylic acid mixture as described in (a) and having a metal ratio of about 14.5 is prepared as a clear, golden orange filtrate containing about 50% naphtha and characterized by a calcium sulfate ash content of about 45.6%. The process involves first neutralizing the carboxylic acids with a stiochiometrically equivalent amount of calcium hydroxide and then adding with carbonation two increments of calcium hydroxide, each providing about seven equivalents of calcium for each equivalent of acid.

EXAMPLE 2

(a) A mixture of 520 parts mineral oil, 480 parts of a sodium salt of an alkylated benzene sulfonic acid (average molecular weight 480), and 84 parts of water is heated at about 100° C. for four hours. The mixture is then heated with 86 parts of a 76% aqueous solution of calcium chloride and 72 parts of lime (90% purity) at 100° C. for two hours, dehydrated by heating to a water content of less than 0.5%, cooled to 50° C., mixed with 130 parts of methyl alcohol, and then blown with carbon dioxide at 50° C. until substantially neutral. The resulting mixture is heated to 150° C. to remove methyl alcohol and water and the resulting oil solution of the basic calcium sulfonate filtered. The filtrate is characterized by a calcium sulfate ash content of 16% and a metal ratio of about 2.5. A mixture of 1305 parts of this filtrate, 930 parts of mineral oil, 220 parts of methyl alcohol, 72 parts of isobutyl alcohol, and 38 parts of amyl alcohol is heated to 35° C. and subjected to the following procedure four times: mixing with 143 parts of lime (90% calcium hydroxide) and treating the mixture with carbon dioxide until it has a base number of 32–39. The resulting carbonated mixture is heated to 155° C. during a period of nine hours to remove the alcohol and subsequently filtered. The filtrate is a mineral oil solution of the desired carbonated, calcium-overbased sulfonic acid salt (metal ratio about 12.2) characterized by a calcium sulfate ash content of about 39.5%.

(b) A carbonated, calcium-overbased metal salt is prepared according to the general procedure of Example 2(a) except that the slightly basic calcium sulfonate having a metal ratio of 2.5 is replaced with a mixture of that calcium sulfonate (280 parts weight) and tall oil acids (970 parts having an equivalent weight of 340) and the total amount of calcium hydroxide used is 930 parts. The filtrate is characterized by a calcium sulfate ash content of 48%, and an oil content of 31%. The carbonated, calcium-overbased acid salt mixture has a metal ratio of about 7.7.

(c) A carbonated, calcium-overbased organic acid salt prepared according to the general procedure of Example 2(a) except that the slightly basic calcium sulfonate starting material having a metal ratio of 2.5 is replaced with tall oil acids (1250 parts having an equivalent weight of 340), and the total amount of calcium hydroxide is 772 parts. The acid salt thus produced has a metal ratio of 5.2. The filtrate is characterized by a calcium sulfate ash content of about 41% and an oil content of about 33%.

(d) A carbonated, calcium-overbased salt is prepared by the general procedure of Example 2(a) except that the slightly basic calcium sulfonate starting material is replaced with a mixture of that basic calcium sulfonate (555 parts) and tall oil acids (694 parts having an equivalent weight of 340) and the amount of calcium hydroxide used is 772 parts. The filtrate is a mineral oil solution of the desired overbased salt having a metal ratio of about 7.9 and is further characterized by sulfate ash content of about 45% and an oil content of about 32%.

EXAMPLE 3

(a) A mixture comprising 80 parts water, 60 parts methanol, and 60 parts isopropanol is added to 1000 parts of a filtrate prepared according to the general procedure of Example 2(a) and the resulting mixture is heated to reflux (about 77° C.) over a 0.5 hour period. This material is then refluxed for one hour at this temperature with vigorous mechanical stirring. At the completion of this homogenization step, the product is a gel. Approximately half of the gel is then stripped by heating and stirring at 160° C for 1.75 hours producing a very stiff dark brown gel. The remaining portion was stripped several days later by heating at 150° C. for 1.25 hours. There is no apparent difference in the two gels.

(b) Five hundred parts of a homogenized carbonate, calcium-overbased sulfonic acid salt prepared according to the general procedure of Example 3(a), in 250 parts toluene and 20 parts water is carbonated for about 0.75 hour. The carbonated product is then heated to 145° C. over a two-hour period to strip water and toluene from the product. The stripped product is characterized by a neutralization number (phenophthalein) of less than one (acid).

(c) The general procedure of Example 3(b) is repeated except that sulfur dioxide is used in lieu of carbon dioxide. After stripping is completed, the sulfur dioxide blown homogenized product is an opaque, yellowish brown viscous liquid characterized by a sulfur content of 5.48% and a calcium sulfate ash content of 39.67%.

(d) A homogenized, carbonated, calcium-overbased sulfonic acid is prepared according to the general procedure of Example 2(a) except that the mineral oil is replaced with VM and P naphtha. 1000 parts of the homogenized product thus produced, 540 parts additional parts VM and P naphtha, 100 parts water and 100 parts methanol is thoroughly mixed while heating at about 75° C. for 3 hours during which time the material becomes lighter in color, somewhat opaque, and thickens. This thickened product is then blown with carbon dioxide for 0.5 hour while the temperature is maintained at about 58°–75° C. At the end of this carbonation, the gel has a neutralization number (phenophthalein) of less than one (acid). Thereafter, the material is stripped by heating from 58° C. to 115° C. over 1.6 hours while blowing with nitrogen during which time 199 parts of water and alcohol are removed.

EXAMPLE 4

(a) A homogenized product prepared according to the general procedure of Example 3(a) is diluted with an equivalent weight of low viscosity mineral oil. Thereafter 2500 parts of this diluted homogenized product, 232 parts calcium hydroxide, 50 parts water, 50 parts methanol, and 1250 parts toluene is carbonated while maintaining a temperature of 50°–55° C. for 1.5 hours at which time the carbon dioxide uptake has substantially ceased. Thereafter, 942 parts additional low viscosity mineral oil is added and the resulting material is blown with nitrogen gas while heating from 50° C. to 120° C. over a two-hour period. The mass is then stripped to 160° C. and a pressure of 20 mm. (Hg) over 1.8 hours. The product is a brown viscous liquid characterized by a calcium sulfate ash content of 24.91% and a mineral oil content of 75%. This corresponds to a total metal ratio of 24.

(b) A mixture comprising 750 parts of a homogenized product produced according to the general procedure of Example 3(a), 333 parts of calcium hydroxide, 38 parts of low viscosity mineral oil, 25 parts water, 65 parts methanol, and 1000 parts toluene is carbonated while maintaining a temperature of about 45°–50° C. for 3.75 hours at which time the carbon dioxide uptake has substantially ceased. The carbonated mass is then stripped to a temperature of 150° C. over a two-hour period. The resulting material is a very stiff tan gel characterized by a calcium sulfate ash content of 73.95% and a total mineral oil content of about 33%. This corresponds to a metal ratio of 36.

(c) A mixture comprising 200 parts of a homogenized product produced according to the general procedure described in Example 3(a), 1100 parts low viscosity mineral oil, 222 parts of calcium hydroxide, 100 parts of toluene, 20 parts water, and 50 parts methanol, is carbonated while maintaining a temperature of 50°–55° C. for 2.75 hours during which time an additional 20 parts water, 100 parts toluene and 50 parts methanol are added. Carbonation is continued at this same temperature for an additional three hours. Thereafter, the carbonated mass is dried by blowing with nitrogen while heating from 50° C. to 160° C. over 1.25 hours. The product is a beige liquid characterized by a sulfate ash content of 30.1% and contains a total of about 75% low viscosity mineral oil. This corresponds to a metal ratio of about 78.

EXAMPLE 5

A mixture comprising 2000 parts of a carbonated, calcium-overbased sulfonic acid prepared according to the general procedure of Example 2(a) wherein VM and P naphtha was substituted for the mineral oil, 193 parts of mineral oil, 160 parts water, 120 parts methanol, 120 parts isopropanol, and 307 parts additional VM and P naphtha is heated at reflux for about two hours while thoroughly mixing with a mechanical mixing device. The material becomes lighter and very thick. Then, 693 parts of VM and P naphtha is added and the resulting mass is blown with carbon dioxide for about 0.5 hour during which time the homogenized product becomes substantially neutral. The carbonated mass is then stripped to a temperature of 100° C. and a pressure of 1 mm. (Hg) over a 1.5 hour period to produce a thick, dark brown gel characterized by a calcium sulfate ash content of 54%.

EXAMPLE 6

A mixture comprising 1000 parts of a carbonated, calcium-overbased sulfonic acid prepared according to the general procedure of Example 2(a) where VM and P naphtha is substituted for mineral oil, 500 parts additional VM and P naphtha, 150 parts water, and 150 parts of methanol are vigorously mixed while maintaining the reflux temperature for a period of about 2.5 hours. This homogenization procedure causes the material to gel. The gel is then blown with carbon dioxide for about 0.5 hour until it is substantially neutral. After carbonation, the gel is heated from 75° C. to 110° C. over three hours while blowing with nitrogen during which time 300 parts of water and methanol are removed. The gelled material is then stripped to a temperature of 100° C. and a pressure of 1 mm. (Hg) to remove 350 parts of VM and P naphtha. The resulting product is a clear brown gel.

EXAMPLE I (a) Xylene is added to a post-carbonated homogenized product prepared according to the general procedure of Example 3(b) in an amount sufficient to provide a weight ratio of homogenized product to xylene of 70:30. A mixture comprising 1333 parts of the xylene diluted homogenized product, 667 parts toluene, 185 parts calcium hydroxide, 40 parts methanol, and 40 parts water is carbonated for two hours while maintaining a temperature of 50° C. to 70° C. At the end of this time, the carbonated mixture is slightly acidic. The carbonated mixture is then heated from 70° C. to 120° C. over a 2.5 hour period to remove water and methanol. The resulting mixture is a pale brown liquid solution of the diluted homogenized calcium-over-based sulfonic acid salts which is now characterized by a metal ratio of about 24.

(b) One hundred parts of the product of Example I(a) is added at room temperature to 200 parts of acetone. The desired calcium-containing micellar complex precipitates. After settling for 0.5 hour, the liquid portion is decanted. Then an additional 100 parts of acetone are added to the precipitate and again the whole is allowed to stand for 0.5 hour. The liquid is again decanted and an additional 100 parts of xylene is added with stirring. The precipitate settles over a 0.5 hour period and recovered by filtration. The solid filtered material is dried in an oven for two hours producing a beige powder characterized by a calcium carbonate content of 73.6%. Analysis of the acetone washings establishes that there are 15.4 parts of oil in the first, 5.2 parts in the second, and 2.8 in the third.

(c) Five hundred parts of the product produced according to Example I(a) is added to 1000 parts of acetone at room temperature. The desired calcium-containing micellar complex precipitates and is filtered. The filter cake is then dissolved in 190 parts of 1,1,1-trichloroethane to produce a dark brown opaque liquid which consists essentially of about 36% of the desired precipitated micellar complex, 29% acetone, and 34% 1,1,1-trichloroethane.

(d) Five hundred parts of the diluted product of Example I(a) is added to 1000 parts of acetone at room temperature. The desired calcium-containing micellar complex precipitates and is recovered by filtration and dried. The dried product is a beige powder containing 1.47% sulfur, and 69.8% calcium carbonate.

EXAMPLE II (a) A mixture comprising 500 parts of isopropanol and 1500 parts of a product prepared according to the general procedure of Example 3(b) is heated to about 60° C. and added to a flask containing 4000 parts of isopropanol. A beige precipitate forms immediately as the first formed mixture is added to the isopropanol. The resulting mixture is stirred for about 0.25 hour and the liquid phase is decanted. The precipitate is then dried in an oven for 72 hours at 130° C. The product is a hard brown solid which can be easily reduced to a powder by ball milling or other types of grinding. The solid is characterized by a calcium sulfate ash content of 68.4%, a $CO_2$ content of about 18.6%, and a sulfur content of 2.18%.

(b) Five hundred parts of the homogenized product prepared according to the general procedure of Example 3(b) is added to 1500 parts of isopropanol and mixed for 0.5 hour at room temperature. This mixture is then centrifuged and the thus isolated calcium-containing micellar complex placed in an oven and dried for three hours at 50° C. The resulting material is the desired micellar complex in the form of a solid brown material containing 23.8% calcium.

EXAMPLE III (a) A post-carbonated homogenized product prepared according to the general procedure of Example 3(b) is diluted with xylene in an amount sufficient to provide a 70:30 weight ratio of homogenized product to xylene. Subsequently, 2500 parts of this mixture is added at room temperature to a previously prepared mixture of 6250 parts each of acetone and isopropanol. The desired calcium-containing micellar complex precipitates immediately and is allowed to settle over a two-hour period. Most of the liquid is removed from the precipitate by decantation and the remainder is thereafter removed by drying in a vacuum oven. The final product is a dark brown easily powdered solid.

(b) To a mixture comprising 2100 parts each of acetone and isopropanol is added 1066 parts of the diluted homogenized product described in Example III(a) above and mixed for about 0.75 hour. The precipitate which forms is then allowed to settle and most of the liquid layer is subsequently removed by decantation. The precipitate is filtered producing 530 parts of wet filter cake. Then 265 parts of the wet filter cake is dried in a vacuum oven producing 166 parts of dry material which is pebble-milled to produce a fine, light-brown powder which is the desired calcium-containing micellar complex. The powder is characterized by a calcium content of 24.1% and a sulfur content of 2.2%.

The remaining half of the filter cake containing about 37% liquid solvent is mixed with 289 parts of 1,1,1-trichloroethane to produce a 30% solution of the desired calcium-containing micellar complex.

(c) A mixture comprising 500 parts of a homogenized material prepared according to the general procedure of Example 3(b) and 1500 parts of acetone is mixed for 0.5 hour at room temperature during which time a precipitate forms. The liquid layer is then removed by decantation and 1500 parts of isopropanol are added for an additional 0.5 hour. Again the liquid layer is decanted and the precipitate is recovered by filtration and thereafter dried by heating for three hours at 50° C. in a vacuum. The product is a brown powder characterized by a calcium content of 24.7%.

(d) A mixture comprising 2000 parts of a homogenized product prepared according to the general procedure of Example 3(b) and 6000 parts acetone is stirred for 0.5 hour at which time 2000 additional parts of acetone are added and stirring is continued for 0.25 hour. Most of the liquid layer is then removed by decantation and 6000 parts of isopropanol are thereafter added to the precipitate and mixed for 0.5 hour. Again, the liquid layer is removed by decantation and the precipitate recovered by filtration. The filtrate is dried in a vacuum oven at 50° C. and the dried material is ball-milled. The product is a fine beige powder characterized by a sulfur content of 2.4% and a calcium content of 24.1%.

(e) To a mixture comprising 1000 parts hexane and 4000 parts of acetone there is added 1000 parts of a xylene-diluted post-carbonated homogenized product prepared according to the procedure of Example 3(b) (diluted with xylene to produce a weight ratio of homogenized product to xylene of 70:30). This mixture is stirred for about ten minutes at room temperature and thereafter the precipitate which formed almost immediately is allowed to settle for 0.5 hour. Then, 3984 parts of liquid is removed by decantation, 2000 parts acetone and 500 parts hexane is added and mixed with the precipitate. After allowing the precipitate to settle, 2383 parts of liquid are decanted and 2000 parts of acetone, and 500 parts hexane are added to the precipitate. After stirring and settling, 2849 parts of liquid are removed by decantation. Then 800 parts of 1,1,1-trichloroethane are added to the precipitate and the resulting mixture is heated on a waterbath maintained at a temperature of about 80° C. while blowing with nitrogen to produce a clear, dark brown viscous liquid solution of the desired calcium-containing micellar complex comprising about 51% 1,1,1-trichloroethane and about 6–7% of a mixture of acetone and hexane.

EXAMPLE IV

A Soxhlet extractor thimble is filled with 100 parts of a post-carbonated homogenized material prepared according to the general procedure of Example 3(b). It is thereafter extracted for 48 hours with refluxing hexane. The desired calcium-containing micellar complex remains in the thimble and is dried for three hours at 50° C. in a vacuum oven. A light brown powder characterized by a calcium content of 24.2% is thus produced.

EXAMPLE V (a) A mixture comprising 1500 parts of a carbonated, calcium-overbased sulfonic acid prepared according to the general procedure of Example 2(a) (except the mineral oil was replaced with VM and P naphtha), 120 parts water, 90 parts methanol, and 90 parts isopropanol is homogenized by thoroughly mixing while heating at the reflux temperature (about 75° C.) during which time the mixture thickens and finally is transformed into a light brown gel. This gelled material is then dried in an oven at about 143° C. for nine hours. The dried, calcium-containing micellar complex is then powdered in a mortar. This powder is characterized by a calcium sulfate ash content of 68.7% and a $CO_2$ content of about 18.32%.

(b) The general procedure of Example V(a) is repeated substituting 2000 parts of the same carbonated, calcium-overbased sulfonic acid salt, 160 parts water, 120 parts methanol and 120 parts isopropanol. The mixture is heated under reflux conditions for about one hour with thorough mixing during which time a light brown gelled material forms. This gel is spread evenly over two trays and dried in an oven for eighteen hours at 80° C. and two hours at 130° C. After drying it is crushed in a mortar to produce a brown powder characterized by a calcium sulfate ash content of 66.48%, a sulfur content of 2.83%, and a $CO_2$ content of 18.1%.

(c) The procedure of Example V(b) above is repeated but the gel material is dried by spreading on a tray and drying for three days at room temperature. After drying the material is powdered, the powder being characterized by calcium content of 18%.

(d) Five hundred parts of the homogenized product prepared according to the general procedure of Example 3(b) and 167 parts of xylene are thoroughly mixed for one-half hour. This mixture is deposited on steel panels in about four-mil thick layers and heated in a drying oven at a temperature of between 300°–315° C. for five minutes. The panels are then removed and the solid deposit scraped therefrom. The desired calcium-containing micellar complexes formed in this manner are in the form of a brown, flaky powder characterized by a sulfur content of about 3% and a calcium content of about 22.6%.

EXAMPLE VI (a) The carbonated, calcium-overbased carboxylic acid mixture produced according to the procedure of Example 1(b) is homogenized according to the general procedure set forth in Example 3(a). The homogenized product is thereafter treated with acetone according to the general procedure of Example IV(d) to precipitate the desired calcium-containing micellar complex. The precipitate is subsequently recovered by filtration and dried in a vacuum oven.

(b) The procedure of Example VI(a) above is repeated substituting the carbonated, calcium-overbased organic acid mixture produced according to the procedure of Example 2(b) above for that of Example 1(b).

The foregoing examples are illustrative of preferred embodiments of this invention. Obviously, these processes can be varied in accordance with the general description of the invention presented in detail hereinbefore. Likewise, as will be apparent to those skilled in the art, other specific embodiments of the invention are readily available by replacing all or a portion of those materials used in the foregoing examples with other equivalent materials as described hereinbefore. For example, the acetone employed in some of the foregoing examples can be replaced with other equivalent ketones such as methyl ethyl ketone or a portion of the acetone can be replaced by methyl ethyl ketone or some other ketone. Likewise, the isopropanol can be replaced by ethanol, methanol, isobutanol, etc., or mixtures of these. The calcium-overbased carboxylic and sulfonic acids employed can be replaced with other carbonated, calcium-overbased organic acid as described herein. These salts can be carboxylic acid salts, sulfonic acid salts, phosphorus acid salts, etc., such as are described in U.S. Pats. 3,150,088 and 3,321,399. In making these replacements or such substitutions, the substituting material is substituted on an equivalent basis or within the general parameters described hereinabove.

The micellar complexes of this invention are readily and stably dispersible in nonpolar organic liquids simply by admixing them with such liquids at room temperature. This is a very important characteristic of these micellar complexes and, as suggested above, makes them particularly useful for incorporating calcium carbonate into plastics, paints, rubber, caulks, and the like. This dispersibility greatly facilitates the homogeneous dispersion of the calcium carbonate particles throughout the organic material to which it is added. Furthermore, dispersing the micellar complexes in organic diluents prior to incorporating them into various plastics, paints, caulks, rubbers, and the like further facilitates handling and mixing in many instances. For example, the micellar complex can be dissolved in 1,1,1-trichloroethane and the resulting solution added to a plastic or rubber material. After mixing is accomplished, the 1,1,1-trichloroethane can be removed by evaporation. Similarly, the micellar complexes can be stably dispersed in other organic liquids, particularly nonpolar organic liquid diluents such as normally liquid halogenated hydrocarbons and hydrocarbons, e.g., benzene, toluene, xylene, nonane, hexane, cyclohexane, 1,1,2-trichloroethane, 1,1,2-tribromoethane, 1,1,2,2-tetrachloroethane, chlorobenzene, and the like, to assist in mixing and handling them. In many instances, liquids which can be easily removed by evaporation such as 1,1,1-trichloroethane are preferred since they facilitate mixing but are easily removed later. However, they can be used in their dried, powdered form. In fact, their ready dispersibility in that form makes them ideally suited for applications where the presence of volatile organic liquid diluent carriers is undesirable.

The micellar complexes of the invention will be used primarily as fillers and modifiers of rheological properties in the paints, caulks, plastics, and so forth in which they are employed. While the optimum amount for any given application will depend upon the particular micellar complex and the specific application involved, the micellar complexes will generally be employed in those amounts which will provide a calcium carbonate content equal to the calcium carbonate content ultilized when conventional calcium carbonate is added to these materials. For example, in making polyester molded laminates, the micellar complexes can be employed in amounts that will provide from about 25% to about 50% by weight of the total weight of the mix. When so incorporated, the micellar complex lowers the pound-volume cost, improves surface smoothness and hardness, increases heat resistance, impact and flexural strength, and reduces mold shrinkage. The micellar complexes are particularly useful as additives in conventional polyester gel coats because of their excellent dispersibility. In this application they can be used in amounts up to that which provides about 25% by weight calcium carbonate based on the total weight of the polyester mix. In this application, the micellar complexes impart brightness, smoothness, hiding power, and better adhesion. The micellar complexes can be employed in conventional epoxy adhesives in amounts that provide from about 5% to about 50% by weight of the total weight of the adhesive with an average of from about 15% to 30% usually being sufficient to impart the desired properties. In this application, the micellar complex increases tensile and sheer strength, reduces shrinkage, increases heat resistance, and reduces thermal expansion. In phenolic resins, heat resistance and impact strength are improved, mold shrinkage decreased, and cost is reduced. When used in phenolics, the amount of micellar complex added usually provides calcium carbonate in an amount that constitutes 30%–70% by weight of the total composition. In polyurethane foams, amounts of micellar complex can be used which will provide from about 10% to about 50% by weight of the total weight of urethane foam. In this application, the micellar complexes decrease the cost of the material, lower compressibility, and contribute to a more uniform cell structure. In polyethylene and polypropylene plastics, the micellar complexes add strength, opacity, and hardness and reduce costs. They are likewise useful as additives for polyvinyl chloride resins where they function as fillers and thixotropic agents. Similarly, the micellar complexes can be added to polysulfide caulks and sealants to improve the rheological properties.

The use of calcium carbonate in various resin compositions to achieve the foregoing results is well-known in the art. Calcium carbonate is presently used extensively in many of these suggested applications. Likewise, calcium carbonate is presently used in formulating various rubber compositions and paints. Therefore, those skilled in the art will have no difficulty in readily utilizing the micellar complexes of this invention since all that is required is the substitution of the present calcium-containing micellar complexes for the calcium carbonate presently being used in amounts that will provide substantially (e.g. ±10%) that amount of calcium carbonate they are currently using. However, because the calcium-containing micellar complexes are so readily dispersible, it will be found that in many applications, the same results can be achieved with a lesser amount of calcium carbonate in the micellar complex form. Likewise, the total amount of calcium carbonate which can be homogeneously incorporated into a given material may be significantly increased in many applications to further improve such properties as heat resistance and lower cost.

Another use for the solid, calcium-containing micellar complexes of this invention is in the preparation of thickened lubricating oils derived from either natural or synthetic base stocks by mixing the complexes with the base stocks. The complexes are capable of thickening these base stocks to viscous liquids or greases depending on the amount of complex employed. The thickened liquids and greases can be used as lubricants and as protective coatings for metal surfaces to protect against oxidation and corrosion.

To illustrate this thickening capability a solid, calcium-containing micellar complex is prepared by precipitating such a solid complex from the stripped product of Example 3(b) by mixing the stripped product with acetone and hexane in a weight ratio of about 1:4.5:1.1 to precipitate the desired solid complex. After separating but without drying the precipitated solid complex, it is dissolved in 1,1,1-trichloroethane, the weight ratio of precipitate to solvent being about 1:0.95. The resulting solution is then used to prepare thickened synthetic oils as described below:

(a) A grease is prepared by mixing 400 parts of Emery 0711 synthetic oil (polyester type) with 1150 parts of the above-described 1,1,1-trichloroethane solution for ten minutes in a double-arm Day mixer and thereafter subjecting the mixture to a vacuum (20 mm. Hg) for 1.5 hours. The resulting mixture is then heated at about 82° C. for about two hours. The heat-treated mixture is a grease which is improved insofar as stiffness or penetration is concerned by milling in a Tri-homo disperse-homogenizer mill with rotor-stator clearance of 0.001 inch.

(b) Following the general procedure of (a) immediately above, additional greases were prepared from other synthetic base stocks by mixing and milling the indicated base stocks with the above-described 1,1,1-trichloroethane solution in a weight ratio of 250:716:

Synthetic base stocks employed (1) Synthetic Hydrocarbon Oil BBM230 available from Monsanto Chemical Company.

(2) Tri-(2-ethylhexyl)-phosphate available as Flexol TOF from Union Carbide Corporation.

(3) Polyglycol ether available as UCON LB–300X from Union Carbide Corporation.

When prepared in the foregoing manner, the final greases contain approximately 50% by weight of the synthetic base stock. By serial dilution of these greases with additional base stock, grease containing 65% and 75% by weight synthetic base stock are prepared.

Grease-making techniques are well-known in the art and no further discussion thereof is appropriate herein. By substituting other micellar complexes of the type described herein for the one used in the foregoing grease-making examples and/or by replacing the synthetic base stocks employed in those examples with other such base stocks, additional greases can be readily prepared.

In some of the foregoing applications, the presence of oil is undesirable. For example, in the preparation of epoxy adhesives, oil may interfere with the desired adhesive qualities particularly if it migrates to the interface of the adhering surfaces. In these applications, micellar complexes can be utilized which were prepared by oil-free processes or from which the oil has been substantially removed or reduced as the particular application requires thorough washing or extracting with organic solvents for oil, etc. However, as those micellar complexes which are formed from carbonated, calcium-overbased organic acid salts prepared and/or homogenized in the presence of mineral oil appear to be the ones which are most easily and stably dispersed, it is usually preferred that the carbonated, calcium-overbased organic acid salts be prepared and/or homogenized in the presence of mineral oil even if a particular application requires a substantially mineral oil-free material. The oil can be removed from the micellar complex by precipitation with subsequent washing, solvent extraction, and the like.

What is claimed is:

1. A solid, calcium-containing micellar complex substantially free from organic liquid diluent and which is capable of being stably dispersed in nonpolar organic liquid upon admixing with said liquid, said complex consisting essentially of calcium carbonate and at least one alkaline earth metal salt of an organic acid susceptible to overbasing, the equivalent ratio of calcium present in said micellar complex as calcium carbonate to alkaline earth metal present as normal organic acid salt being from 2:1 to about 100:1, said complex being further characterized by X-ray diffraction patterns corresponding to that of calcite having an average crystallite size within the range of 25 A. to about 400 A. along the shortest dimension.

2. A solid, calcium-containing micellar complex according to claim 1 in the form of a powder.

3. A solid, calcium-containing micellar complex according to claim 1 consisting essentially of calcium carbonate and a calcium salt of at least one organic acid selected from the group consisting of carboxylic acids and sulfonic acids containing at least seven aliphatic carbon atoms, the equivalent ratio of calcium present as calcium carbonate to calcium present as normal organic acid salt being such that the metal ratio of said complex is about 3 to about 100, at least 25% of the calcium carbonate present in the complex being in a form which produces X-ray diffraction patterns corresponding to calcite.

4. A solid, calcium-containing micellar complex according to claim 3 consisting essentially of calcium carbonate and a calcium salt of at least one sulfonic acid containing at least twelve aliphatic carbon atoms, the equivalent ratio of calcium present as calcium carbonate to calcium present as the normal calcium salt of said at least one sulfonic acid being such that the metal ratio of said complex is about 4.5 to about 40, at least 50% of the calcium carbonate present in the complex being in a form which produces X-ray diffraction patterns corresponding to that of calcite.

5. A solid, calcium-containing micellar complex according to claim 4 wherein said at least one sulfonic acid is an alkylated benzene sulfonic acid.

6. A micellar complex according to claim 4 wherein from 75% to substantially all of the calcium carbonate present in the complex is in a form which produces X-ray diffraction patterns corresponding to that of calcite having an average crystallite size of about 25 A. to about 200 A.

7. A composition consisting of at least one substantially inert organic liquid diluent and from about 10% to about 80% by weight of a micellar complex according to claim 1 prepared by contacting the requisite amount of said complex with said at least one substantially inert organic liquid diluent.

8. A composition consisting of at least one non-polar substantially inert liquid diluent in which there has been stably dispersed from about 10% to about 80% by weight of a micellar complex according to claim 1 prepared by admixing the requisite amount of said complex with said at least one nonpolar substantially inert organic liquid diluent.

9. A composition according to claim 8 wherein said inert organic liquid diluent is 1,1,1-trichloroethane.

10. A process for preparing a solid, calcium-containing micellar complex according to claim 1 comprises homogenizing a carbonated, calcium-overbased organic acid salt having Newtonian properties and a metal ratio of at least 3 which is homogeneously dispersed in a substantially inert, nonpolar organic liquid diluent in the presence of at least one member selected from the class consisting of alcohols containing up to twelve carbon atoms, water, and mixtures of these for a time sufficient to give non-Newtonian properties and thereafter separating from the resulting homogenized product substantially all of the nonpolar organic liquid diluent, alcohols, and water from the remainder of the reaction mixture thereby isolating the micellar complex, wherein the proportion of the conversion agent in the homogenization step is from about 1% to about 80% based upon the weight of the carbonated, calcium-overbased organic acid salt excluding the weight of inert, organic diluents and any promoter remaining.

11. The process according to claim 10 wherein the separating step is accomplished by mixing the homogenized product with a substantially inert polar organic liquid to precipitate the desired micellar complex.

12. The process according to claim 11 wherein the polar organic liquid is selected from the class consisting of ketones and alcohols.

13. The process according to claim 10 where the separation step is accomplished by evaporating substantially all of the diluent, alcohols, and water from the homogenized product.

14. The process according to claim 13 where evaporation is accomplished at subatmospheric pressure.

References Cited
UNITED STATES PATENTS

| | | | |
|---|---|---|---|
| 2,763,615 | 9/1956 | Faust | 252—33 |
| 3,377,283 | 4/1968 | McMillen | 252—33 |
| 3,242,079 | 3/1966 | McMillen | 252—33 |
| 3,422,013 | 1/1969 | Scher | 252—33 |

DANIEL E. WYNN, Primary Examiner

I. VAUGHN, Assistant Examiner

U.S. Cl. X.R.

106—288 B, 306; 252—33.4, 39; 260—37, 38, 40, 41